US010616420B2

United States Patent
Yamakawa et al.

(10) Patent No.: US 10,616,420 B2
(45) Date of Patent: Apr. 7, 2020

(54) INTERCOM SYSTEM

(71) Applicant: AIPHONE CO., LTD., Nagoya-shi, Aichi (JP)

(72) Inventors: Seiya Yamakawa, Nagoya (JP); Kenji Yasukawa, Nagoya (JP); Hayato Takeya, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

(21) Appl. No.: 16/089,329

(22) PCT Filed: Mar. 23, 2017

(86) PCT No.: PCT/JP2017/011797
§ 371 (c)(1),
(2) Date: Sep. 27, 2018

(87) PCT Pub. No.: WO2017/170150
PCT Pub. Date: Oct. 5, 2017

(65) Prior Publication Data
US 2019/0281164 A1   Sep. 12, 2019

(30) Foreign Application Priority Data
Mar. 28, 2016 (JP) ................................ 2016-063067

(51) Int. Cl.
*H04M 11/02*      (2006.01)
*H04M 1/02*       (2006.01)
*H04M 9/02*       (2006.01)

(52) U.S. Cl.
CPC ....... *H04M 11/025* (2013.01); *H04M 1/0291* (2013.01); *H04M 9/02* (2013.01)

(58) Field of Classification Search
CPC ........ H04M 11/02; H04M 1/02; H04M 1/025; H04M 1/0291; H04M 1/274508; H04M 18/04
(Continued)

(56) References Cited

U.S. PATENT DOCUMENTS

2003/0185367 A1\* 10/2003 Shinozaki ....... H04M 1/274525
                                                     379/159
2011/0007883 A1   1/2011 Bingham et al.
2013/0017812 A1\*  1/2013 Foster ................. H04L 12/2825
                                                     455/417

FOREIGN PATENT DOCUMENTS

DE          10030104 A1    1/2002
DE       202011003022 U1   4/2011
(Continued)

OTHER PUBLICATIONS

Extended European Search Report for related European Application No. 17774688.0, dated Jun. 18, 2019; 8 pages.
(Continued)

*Primary Examiner* — Melur Ramakrishnaiah
(74) *Attorney, Agent, or Firm* — Procopio, Cory, Hargreaves & Savitch LLP

(57) ABSTRACT

An intercom system includes a dwelling parent device installed in each dwelling, a collective foyer device configured to communicate with the dwelling parent device, and a control device configured to control the collective foyer device, which includes name plates on each of which a resident name for specifying a dwelling parent device of a resident is displayed so a visitor may call the resident, and dedicated buttons correlated with the name plates and capable of receiving an operation for calling the dwelling parent device corresponding to the resident name displayed on each name plate. The collective foyer device or the control device includes a calling table in which location
(Continued)

numbers for specifying locations of dedicated buttons in a region of the collective foyer device are assigned. The respective resident names are assigned to the location numbers of the dedicated buttons visually recognizable to the visitor, on the calling table.

8 Claims, 5 Drawing Sheets

(58) Field of Classification Search
USPC .............................. 379/167, 102.06, 355.01
See application file for complete search history.

(56) References Cited

FOREIGN PATENT DOCUMENTS

| JP | 60001554 U | * | 1/1985 |
|----|----|----|----|
| JP | S60-011554 U | | 1/1985 |
| JP | 2000-004302 A | | 1/2000 |
| JP | 2000004302 A | * | 1/2000 |
| JP | 2001-323694 A | | 11/2001 |
| JP | 2002247217 A | | 8/2002 |
| JP | 2004-260679 A | | 9/2004 |
| JP | 2006-101328 A | | 4/2006 |
| JP | 2006-304219 A | | 11/2006 |
| JP | 2007-060408 A | | 3/2007 |
| JP | 2007-266978 A | | 10/2007 |
| JP | 2007266978 A | * | 10/2007 |
| JP | 2008160472 A | | 7/2008 |
| JP | 2010-035102 A | | 2/2010 |
| JP | 2010035102 A | * | 2/2010 |
| JP | 2014-045307 A | | 3/2014 |
| JP | 2014045307 A | * | 3/2014 |

OTHER PUBLICATIONS

International Search Report for related International Application No. PCT/JP2017/011797, dated May 16, 2017; English translation provided; 5 pages.
Notification of Reasons for Refusal for related JP App No. 2016-063067 dated Sep. 3, 2019, 11 pgs.
Notification of Reasons for Refusal for related JP App No. JP 2016-063067, dated Nov. 12, 2019, 5 pages.
GT System Apartment Intercom System Installation manual, Aiphone Co., Ltd., <URL, https://web.archive.org/web/20150403235750/ http://www.aiphone.com/home/assets/Uploads/downloads/documents/ products/instructions/GT%20Install -Op%20Manual%200311. pdf>, created Apr. 3, 2015, accessed Dec. 11, 2019, 60 pages.
Notice of Reasons for Refusal for related JP App. No. 2016-063067 dated Jan. 7, 2020; English translation provided. 5 pages.

* cited by examiner

| LOCATION NUMBER | ROOM NUMBER | RESIDENT NAME | QUICK LIST | DWELLING PARENT DEVICE ID |
|---|---|---|---|---|
| 1 | 101 | ABE | | S1 |
| 2 | 102 | FURUYA | 1 | S2 |
| 3 | 103 | HARA | | S3 |
| 4 | 104 | KATO | | S4 |
| 5 | | | | |
| 6 | 201 | SATO | | S5 |
| 7 | 202 | WATANABE | 2 | S6 |
| 8 | 203 | MIYAZAKI | | S7 |
| 9 | | | | |
| 10 | | | | |
| 11 | 301 | HAYASHI | 3 | S8 |
| 12 | 302 | ISOBE | | S9 |
| 13 | | | | |
| 14 | | | | |
| 15 | | | | |
| 16 | 401 | TAKEUCHI | 4 | S10 |

| LOCATION NUMBER | ROOM NUMBER | RESIDENT NAME | QUICK LIST | DWELLING PARENT DEVICE ID | | |
|---|---|---|---|---|---|---|
| 13 | | | | | | |
| 14 | | | | | | |
| 15 | | | | | | |
| 16 | 401 | TAKEUCHI | 4 | S10-1 | S10-2 | S10-3 |

INTERCOM SYSTEM

CROSS-REFERENCE TO RELATED APPLICATIONS

This application is a U.S. National Stage entry of PCT Application No: PCT/JP2017/011797 filed on Mar. 23, 2017, which claims priority to Japanese Patent Application No. 2016-063067, filed Mar. 28, 2016, the contents of which are incorporated herein by reference.

TECHNICAL FIELD

The present invention relates to an intercom system that is to be used in a housing complex.

RELATED ART

In the related art, an intercom system for a housing complex constituted by a plurality of dwelling buildings has been known. In the intercom system, each of the dwelling buildings is connected to a controller by way of an intercom line (an intercom dedicated line).

CITATION LIST

Patent Documents

Patent Document 1: JP-A-2004-260679

SUMMARY OF THE INVENTION

Problems to be Solved by the Invention

A collective foyer device installed in an entrance of each dwelling building may be provided with a dwelling information display unit on which information (room number, a resident name and the like) of each dwelling correlated with the collective foyer device is displayed. For general-purpose uses, the collective foyer device is normally provided with a predetermined number (for example, four) of the dwelling information display units and dedicated input receiving units for calling dwelling parent devices displayed on the dwelling information display units. When the dwelling building including a predetermined number or smaller of dwellings is provided with the collective foyer device so that the number of the dwelling information display units or the dedicated input receiving units can be changed in correspondence to the number of dwellings of each dwelling building, a decorative panel for concealing some of the dwelling information display units and the dedicated input receiving units is provided on the collective foyer device. However, in the collective foyer device having the decorative panel provided thereon, when the respective dwelling parent devices are correlated with the dedicated input receiving units in order from above, the dedicated input receiving unit concealed by the decorative panel is also correlated with the dwelling parent device, so that the appropriate dwelling parent device may not be called.

It is therefore an object of the present invention to provide an intercom system including a collective foyer device capable of calling an appropriate dwelling parent device by a dedicated input receiving unit.

Means for Solving the Problems

In order to achieve the above object, an intercom system of the present invention is an intercom system including a dwelling parent device installed in each dwelling, a collective foyer device configured to communicate with the dwelling parent device, and a control device configured to control the collective foyer device, wherein the collective foyer device includes:

a plurality of dwelling information display units on each of which dwelling information for specifying a dwelling parent device of a resident is displayed so as for a visitor to call the resident, and a plurality of dedicated input receiving units correlated with the dwelling information display units and capable of receiving an operation for calling the dwelling parent device corresponding to the dwelling information displayed on each dwelling information, wherein the collective foyer device or the control device includes a management table in which location numbers for specifying locations of the plurality of dedicated input receiving units in a predetermined region of the collective foyer device are assigned, and wherein the respective dwelling information is assigned to the location numbers of the dedicated input receiving units visually recognizable to the visitor, on the management table.

According to the above configuration, for example, a construction operator or a manager of the intercom system can appropriately correlate the dwelling parent device and the corresponding dedicated input receiving unit, so that it is possible to easily perform a calling setting of the dwelling parent device by using the general-purpose collective foyer device.

Also, in the intercom system of the present invention, a setting of the management table can be changed by an external device that is to be communicatively connected to the collective foyer device or the control device.

According to the above configuration, for example, the construction operator or manager of the intercom system can simply correlate the dwelling parent device and the dwelling information display unit.

Also, in the intercom system of the present invention, the management table may be configured so that a plurality of dwelling parent devices ID is to be assigned to each of the location numbers.

According to the above configuration, even when there is a plurality of dwelling parent devices in the dwelling, it is possible to call each dwelling parent device in the dwelling of a calling destination.

Also, in the intercom system of the present invention, the collective foyer device may have a predetermined number of the plurality of dwelling information display units, and some dwelling information display units of the plurality of dwelling information display units may be invisibly concealed, in correspondence to the number of the dwellings.

According to the above configuration, it is possible to appropriately use the general-purpose collective foyer device having the same number of the dwelling information display units, for a dwelling building of which the number of dwellings is different.

Effects of the Invention

According to the intercom system of the present invention, it is possible to provide the collective foyer device capable of calling the appropriate dwelling parent device by the dedicated input receiving unit.

DETAILED DESCRIPTION OF ILLUSTRATIVE EMBODIMENT

Hereinafter, an example of an illustrative embodiment will be described with reference to the accompanying drawings.

Figure 1:
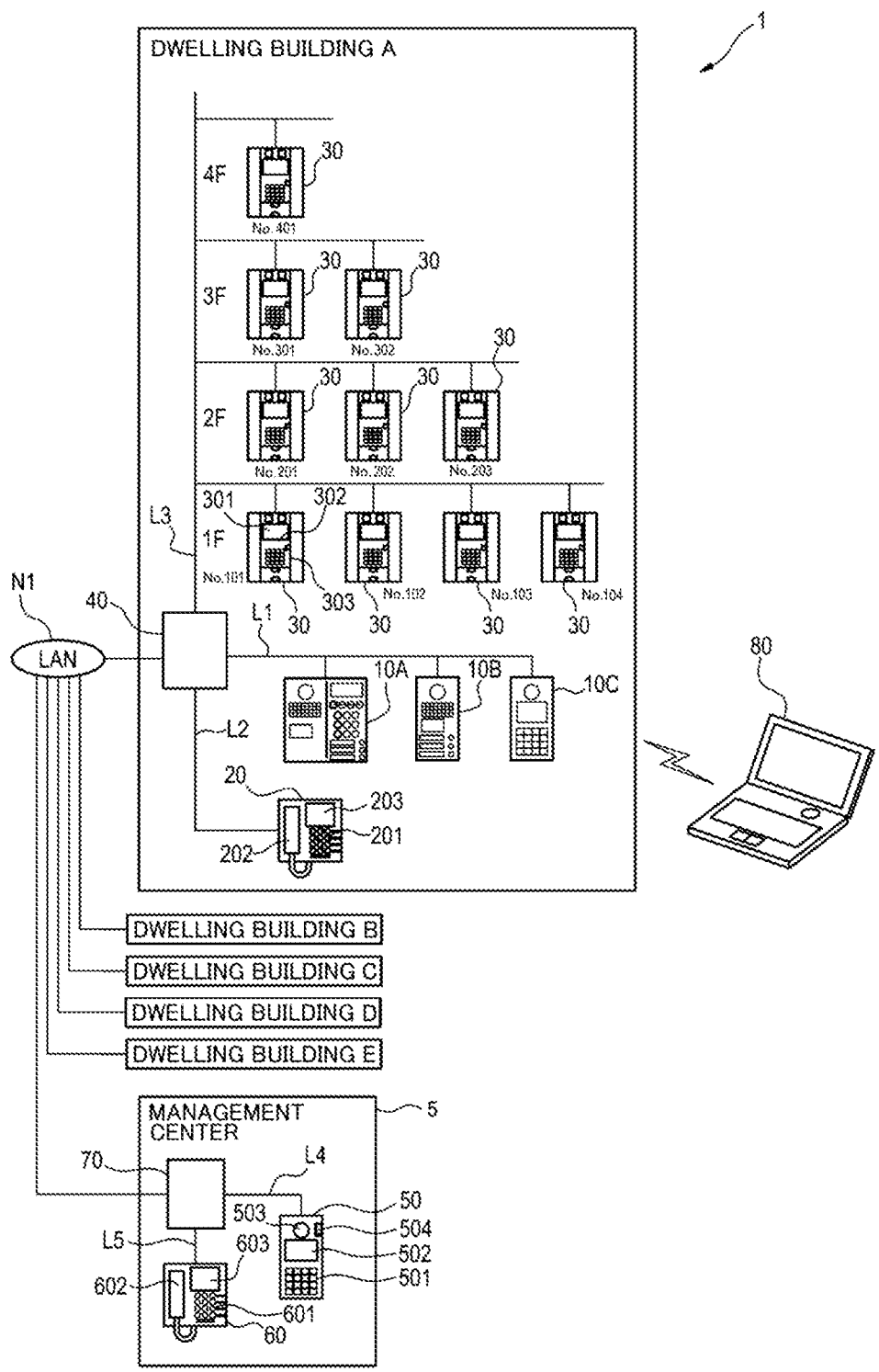
FIG. 1 is a configuration view of an intercom system in accordance with an illustrative embodiment of the present invention.

As shown in FIG. 1, an intercom system 1 is a system that is used in a housing complex such as a condominium building. In the example, a housing complex constituted by a plurality of dwelling buildings (a dwelling building A to a dwelling building E) is shown. However, the present invention can be applied to a housing complex constituted by one dwelling building, too. The dwelling building A to the dwelling building E are interconnected via a network N (in the example, LAN: Local Area Network) configured to perform communication in accordance with a general-purpose protocol. Also, the housing complex includes a management center 5, which is connected to each dwelling building via the network N.

The intercom system 1 includes collective foyer devices 10A to 10C, a management office parent device 20, dwelling parent devices 30, and a building control unit 40 (an example of the control device). In FIG. 1, the respective configurations are shown only for the dwelling building A. However, the dwelling building B to the dwelling building E also have the similar configurations.

The collective foyer devices 10A to 10C (hereinafter, referred to as the collective foyer device 10 when collectively describing the same) are installed in collective foyers, shared spaces and the like of the housing complex. The collective foyer device 10 is configured to call any dwelling parent device 30 in a host building and the management office parent device 20 in the host building, for example. As the collective foyer device, a combined type of a type of inputting a room number and the like by a ten key and a type of pushing a dedicated button correlated with a name of a resident, a store or the like such as the collective foyer device 10A, a dedicated button type such as the collective foyer device 10B a ten key type such as the collective foyer device 10C, and the like may be used. The collective foyer device 10 is communicatively connected to the building control unit 40 via an intercom line (dedicated line) L1. Also, the collective foyer device 10 can be communicatively connected to an external device 80 (for example, a PC (Personal Computer), and the like) via wireless communication (for example, NFC (Near Field Communication), Bluetooth (registered trademark), and the like).

The management office parent device 20 is installed in a management office of the housing complex. The management office parent device 20 is configured to call any dwelling parent device 30 in the host building, for example. Also, the management office parent device 20 includes an operation unit 201, a phone call unit 202, a display unit 203, and the like, and is configured to make a phone call to a visitor at the collective foyer device 10 and to a resident at the dwelling parent device 30. The management office parent device 20 is communicatively connected to the building control unit 40 via an intercom line L2. Also, the management office parent device 20 can be communicatively connected to the external device 80, like the collective foyer device 10.

The dwelling parent device 30 is installed in each dwelling of the housing complex. The dwelling parent device 30 includes a display unit 301, an operation unit 302, a phone call unit 303, and the like, and is configured to respond to a calling from the collective foyer device 10 or the management office parent device 20, for example. In each dwelling parent device 30, information (for example, a dwelling parent device ID: identification) for specifying the dwelling parent device is stored. The dwelling parent device 30 is communicatively connected to the building control unit 40 via an intercom line L3.

The building control unit 40 is configured to control communications that are to be performed among the collective foyer device 10, the management office parent device 20, and the dwelling parent device 30 connected via the intercom lines. Also, the building control unit 40 is communicatively connected to the building control units 40 of the other dwelling buildings (in the example, the dwelling building B to the dwelling building E) and a centralized control unit 70 (which will be described later) of the management center 5 via the network N. Also, the building control unit 40 can be communicatively connected to the external device 80 via the network N.

The management center 5 is configured to manage the whole housing complex from the dwelling building A to the dwelling building E, and includes a centralized collective foyer device 50, a centralized management office parent device 60, and a centralized control unit 70. The centralized collective foyer device 50 is installed in a foyer of the management center 5, and is configured to call any dwelling parent device 30 in each building and the centralized management office parent device 60, for example. The centralized collective foyer device 50 is communicatively connected to the centralized control unit 70 via an intercom line L4. The centralized management office parent device 60 is installed in a management office of the management center 5, and is configured to call any dwelling parent device 30 of each building, for example. The centralized management office parent device 60 is communicatively connected to the centralized control unit 70 via an intercom line L5. The centralized control unit 70 is configured to control communication that is to be performed between the centralized collective foyer device 50 and the centralized management office parent device 60, for example. The centralized control unit 70 is communicatively connected to each building control unit 40 of the dwelling building A to the dwelling building E via the network N.

Figure 2:
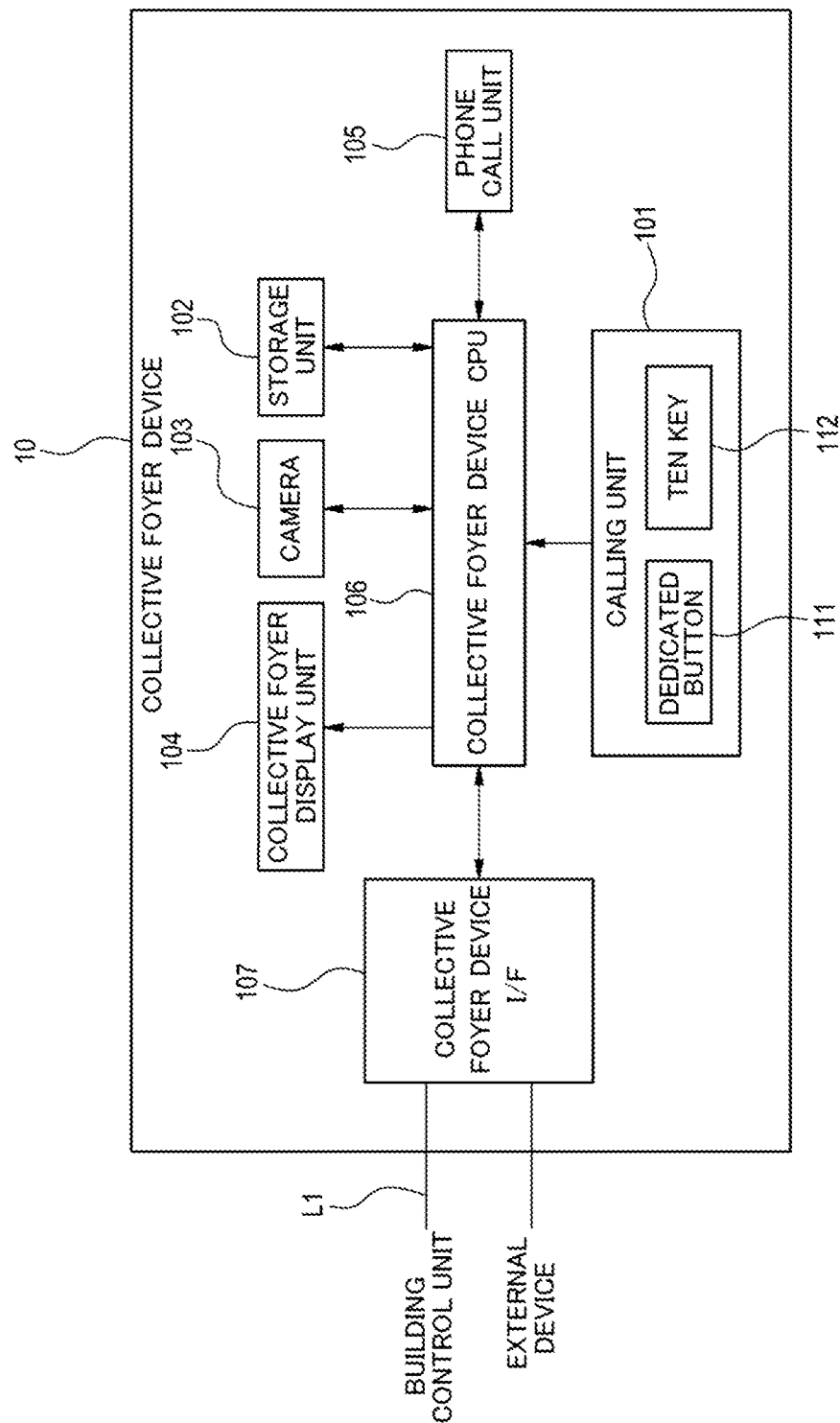
FIG. 2 is a functional block diagram of a collective foyer device.

As shown in FIG. 2, the collective foyer device 10 includes a calling unit 101, a storage unit 102, a camera 103, a collective foyer display unit 104, a phone call unit 105, a collective foyer device CPU 106, and a collective foyer device interface (hereinafter, the interface is referred to as 'I/F') 107.

The calling unit 101 is operated when a visitor or the like calls the dwelling parent device 30 of a visiting destination or the management office parent device 20 of the management office. The calling unit 101 includes a dedicated button 111 (an example of the dedicated input receiving unit) correlated with dwelling information (for example, a name of a resident, a name of each dwelling, and the like) for specifying the dwelling parent device 30 of a calling destination, a ten key 112 with which it is possible to input, for example, a room number for specifying the dwelling parent device 30 of the calling destination, character by character.

In the storage unit 102, a calling table (an example of the management table) is stored in which a location number for specifying a location of the dedicated button 111, a room number of a dwelling, a resident name of a dwelling, a name of a dwelling (for example, a tenant name and the like), a dwelling parent device ID for specifying the dwelling parent device 30 of a dwelling, and the like are associated.

The camera 103 is configured to capture a visitor or the like who operates the collective foyer device 10. The collective foyer display unit 104 is configured to display thereon a room number input from the ten key 112, a message to a visitor, a visitor image captured by the camera 103, and the like. The phone call unit 105 is configured by a microphone and a speaker for making a phone call to a resident or a manager.

The collective foyer device CPU 106 is configured to control each unit of the collective foyer device 10. For example, when a calling signal is input through the calling unit 101, the collective foyer device CPU 106 specifies the dwelling parent device 30 of a calling destination, based on the calling table. Also, the collective foyer device CPU 106 stores, in the calling table of the storage unit 102, setting data acquired from the external device 80 through communication with the external device 80.

The collective foyer device I/F 107 is configured to form a bidirectional signal transmission path between the collective foyer device CPU 106 and the intercom line L1. Also, the collective foyer device I/F 107 is configured to form a signal transmission path of wireless communication between the collective foyer device CPU 106 and the external device 80.

In the meantime, although not shown, the management office parent device 20 also includes a storage unit in which the calling table is stored, like the collective foyer device 10. When a calling signal for calling a dwelling is input to the operation unit 201, the management office parent device 20 specifies the dwelling parent device 30 of a calling destination, based on the calling table. Also, the management office parent device 20 stores, in the calling table of the storage unit, the setting data acquired from the external device 80 through communication with the external device 80.

Likewise, the building control unit 40 includes a storage unit in which the calling table is stored, and specifies the dwelling parent device 30 of a calling destination in the host building on the basis of the calling table when a calling signal is transmitted from the management center 5 through the network N. Also, the building control unit 40 stores, in the calling table of the storage unit, the setting data acquired from the external device 80 through communication with the external device 80.

The collective foyer device 10 is described in detail with reference to FIG. 3. In the meantime, in the example, the collective foyer device 10A having both the dedicated button 111 and the ten key 112 is described.

Figure 3:
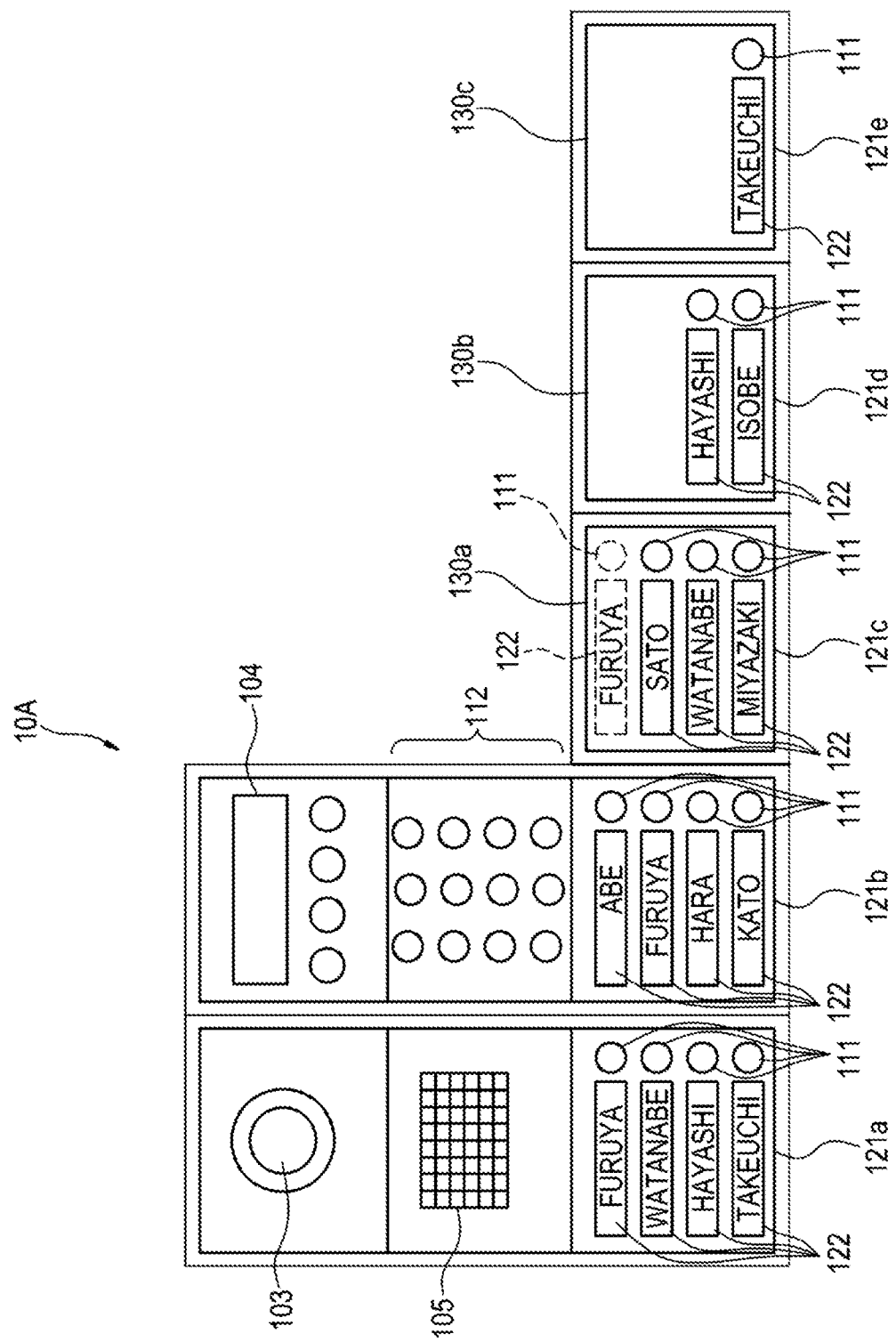
FIG. 3 is a configuration view of the collective foyer device.

As shown in FIG. 3, the collective foyer device 10A includes calling units 121a to 121e (hereinafter, referred to as the calling unit 121 when collectively describing the same) each of which has a predetermined number of (four, in the example) the dedicated buttons 111. The calling unit 121 is configured so that it can be additionally attached or detached, in correspondence to the number of dwellings (residents) of the dwelling building, for example. In the example, the five calling units 121a to 121e are aligned and attached in a horizontal direction (a right and left direction, in FIG. 3). The calling unit 121 may be aligned and attached in a vertical direction (an upper and lower direction, in FIG. 3) as well as the horizontal direction.

The calling unit 121 includes name plates 122 (an example of the dwelling information display unit) having resident names (an example of the dwelling information) displayed thereon and correlated with the respective dedicated buttons 111. The resident name of the name plate 122 is used as information for specifying the dwelling parent device 30 of a visiting destination so as for a visitor to call a resident. In the meantime, the name plate 122 may be displayed thereon with a plurality of resident names.

The calling unit 121 is configured so that a decorative panel (for example, decorative panels 130a to 130c) can be attached on a front surface thereof. The decorative panel is formed to cover a predetermined region of the front surface of the calling unit 121. For example, the decorative panel 130a attached to the calling unit 121c is formed as if it covers and conceals the top dedicated button 111 and name plate 122 shown with the broken lines of the four dedicated buttons 111 and four name plates 122 provided on the calling unit 121c. As the decorative panel 130a is attached, the calling unit 121c is configured so that the operating visitor can visually recognize the three dedicated buttons 111 and the three name plates 122. That is, the top dedicated button 111 and name plate 122 are not used and are not visually recognized to the visitor.

Likewise, for example, the calling unit 121d is configured so that the dedicated buttons 111 and name plates 122 of the two upper stages are covered and concealed by the decorative panel 130b and only the two dedicated buttons 111 and two name plates 122 of the lower stage can be visually recognized. Also, likewise, the calling unit 121e is configured so that the dedicated buttons 111 and name plates 122 of the three upper stages are covered and concealed by the decorative panel 130b and only the one dedicated button 111 and one name plate 122 of the bottom stage can be visually recognized. It is possible to arbitrarily select how many the dedicated buttons 111 and name plates 122 are to be covered and concealed by the decorative panel and which of the dedicated buttons 111 and name plates 122 are to be covered and concealed by the decorative panel, in correspondence to the number of dwellings of the dwelling building. In the meantime, the calling unit 121a and the calling unit 121b are configured so that the four dedicated buttons 111 and the four name plates 122 can be visually recognized. In the example, the calling unit 121a and the calling unit 121b are not attached thereon with the decorative panel. However, a decorative panel through which the four dedicated buttons 111 and the four name plates 122 can be visually recognized may be attached.

The calling table is described in detail with reference to FIG. 4.

Data 1 to 16 of the location numbers stored in the calling table 140 are numbers assigned so as to specify locations of the dedicated buttons 111 provided on the calling unit 121 of the collective foyer device 10A. The location numbers 1 to 4 are numbers associated with the four dedicated buttons 111 provided on the calling unit 121b of the collective foyer device 10A, in order from above. Also, the location numbers 5 to 8 are numbers associated with the four dedicated buttons 111 provided on the calling unit 121c, the location numbers 9 to 12 are numbers associated with the four dedicated buttons 111 provided on the calling unit 121d, and the location numbers 13 to 16 are numbers associated with the four dedicated buttons 111 provided on the calling unit 121e, in order from above, respectively.

The dedicated buttons 111 and the name plates 122 of the calling units 121b to 121e of the collective foyer device 10A are partially covered and concealed by the decorative panels 130a to 130c, as described above. Therefore, in the calling table 140, for location numbers of the covered and concealed dedicated buttons 111 of each calling unit 121, data of room numbers, resident names and dwelling parent devices ID are not stored. For example, for the location number 5 associated with the top dedicated button 111 of the calling unit 121c covered and concealed by the decorative panel 130a, the data of a room number and the like is not stored, as shown in the calling table 140. On the other hand, for the location numbers 6 to 8 associated with the dedicated buttons 111, which can be visually recognized, of the calling unit 121c, the data of a room number and the like is assigned and stored.

The above setting is similar to the location numbers of the dedicated buttons 111 of the calling units 121d, 121e, too. For example, in the case of the calling unit 121d, for the location numbers 9, 10 associated with the dedicated buttons 111 of the two upper stages, which are covered and concealed by the decorative panel 130b, the data of a room number and the like is not stored. On the other hand, for the location numbers 11, 12 associated with the dedicated buttons 111, which can be visually recognized, the data of a room number and the like is stored. Also, for example, in the case of the calling unit 121e, for the location numbers 13, 14, 15 associated with the dedicated buttons 111 of the three upper stages, which are covered and concealed by the decorative panel 130c, the data of a room number and the like is not stored. On the other hand, for the location number 16 associated with the dedicated button 111, which can be visually recognized, the data of a room number and the like is stored.

Figure 4:
FIG. 4 depicts an example of a management table stored in the collective foyer device or a building control unit.

The calling units 121b to 121e shown in FIG. 3 and the calling table 140 of FIG. 4 set in association with the same are formed to correspond to the dwelling parent devices 30 provided on each floor (1F to 4F) of the dwelling building A of FIG. 1.

The collective foyer device 10A may be provided thereon with the dedicated buttons 111 and the name plates 122 for calling preset specific residents (refer to the calling unit 121a of FIG. 3).

The names (FURUYA, WATANABE, HAYASHI and TAKEUCHI) displayed on the name plates 122 of the calling unit 121a are names, which are picked up and displayed separately from the name plates 122 of the calling units 121b to 121e, based on requests of the residents. A visitor can call the picked-up resident by pressing the dedicated button 111 of the calling unit 121a. In the meantime, the name plate 122 of the calling unit 121a may be displayed thereon with a tenant name or the like, for example, in addition to the resident name.

In this case, in order to specify each dedicated button 111 provided on the calling unit 121a, data 1 to 4 of quick lists is stored in the calling table 140. For example, the quick list 1 is associated with the top dedicated button 111 of the four dedicated buttons 111 provided on the calling unit 121a. Also, the quick lists 2 to 4 are respectively associated with the dedicated buttons 111 of the two to four stages of the calling unit 121a.

Figure 5:
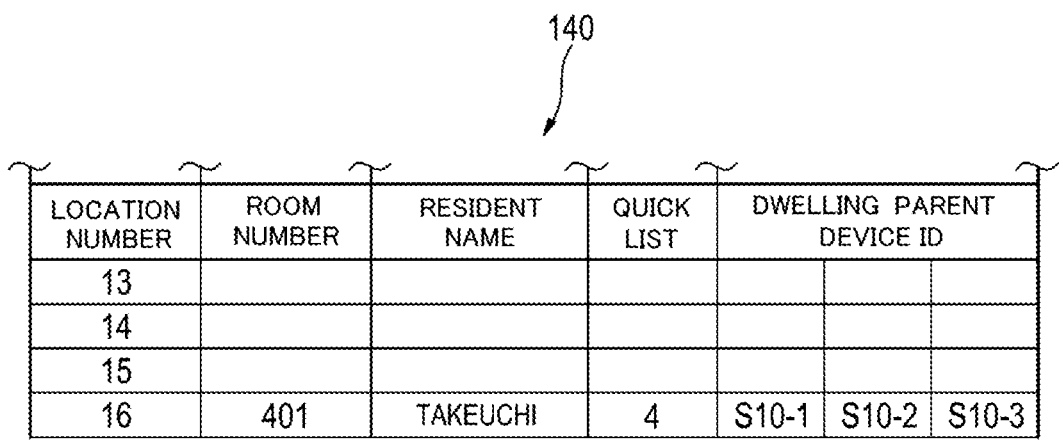
FIG. 5 depicts a modified embodiment of the management table.

As shown in FIG. 5, in the calling table 140, a plurality of dwelling parent devices ID may be assigned to one location number.

For example, when the plurality of (three, in the example) dwelling parent devices 30 is installed in the dwelling of the room number 401, the three dwelling parent devices ID (for example S10-1, S10-2, S10-3) are assigned to the location number 16. In this case, when the dedicated button 111 of the calling unit 121e for calling the resident "TAKEUCHI" is pushed at the collective foyer device 10A, calling sounds are generated from the three dwelling parent devices 30 installed in the dwelling of the room number 401, based on the calling table 140. In the meantime, even when the dedicated button 111 of the calling unit 121a for calling the resident "TAKEUCHI" is pushed, calling sounds are generated from the three dwelling parent devices 30.

Subsequently, operations of the intercom system 1 are described.

For example, when the housing complex including the intercom system 1 configured as shown in FIG. 1 is completed and a construction operator, a manager or the like stores the calling table 140 in the collective foyer device 10 and the like, following operations are performed.

First, the construction operator or the like sets each data of the calling table 140 as shown in FIG. 4 by using a setting tool of the external device 80, for example. Each data of the calling table 140 is set so that it is associated with the resident name of the name plate 122 associated with the dedicated button 111 specified by the location number. For example, the location number for specifying the bottom dedicated button 111 of the calling unit 121b of FIG. 3 is "4", and the name plate 122 associated with the dedicated button 111 is displayed thereon with "KATO". Therefore, in a table of the location number 4 of the calling table 140 shown in FIG. 4, the room number "104", the dwelling parent device ID "S4" and the like are set with being associated with the resident name "KATO". Also, for example, the top dedicated button 111 and name plate 122 of the calling unit 121c of FIG. 3 are covered and concealed with the decorative panel 130a. Therefore, data is not set in a table of the location number 5 for specifying the concealed dedicated button 111. In the meantime, the setting data of the calling table 140 can be repetitively changed through the external device 80.

The calling table 140 set with the external device 80 is transmitted from the external device 80 to the collective foyer device 10A to 10C and the management office parent device 20 through the wireless communication, for example. Also, the calling table 140 set with the external device 80 is transmitted from the external device 80 to the building control unit 40 through the network N.

The collective foyer device 10A to 10C, the management office parent device 20, and the building control unit 40 store the calling table 140 transmitted from the external device 80 in the storage units thereof.

In the meantime, the calling table 140 set with the external device 80 may be transmitted to the building control unit 40 and may be then transmitted from the building control unit 40 to the collective foyer devices 10A to 10C through the intercom line L1 and to the management office parent device 20 through the intercom line L2.

Also, the calling table 140 set with the external device 80 may be transmitted to the collective foyer device 10A and may be then transmitted from the collective foyer device 10A to the other collective foyer devices 10B, 10C and the building control unit 40 through the intercom line L1. Also, the calling table 140 may be transmitted to the management office parent device 20 through the intercom line L2.

According to the intercom system 1, in the calling table 140, the respective data is stored with being associated with the location numbers 1 to 16 for specifying the locations of the dedicated buttons 111 provided on the collective foyer device 10A, and the operations are controlled on the basis of the calling table 140. Therefore, for example, the construction operator of the intercom system 1, the manager of the housing complex and the like can appropriately associate the dwelling parent devices 30 installed in the respective dwellings and the dedicated buttons 111 corresponding to the dwelling parent devices. Thereby, when the visitor looks for the name plate 122 of the visiting destination and pushes the dedicated button 111 corresponding to the name plate, the visitor can surely call the dwelling parent device 30 of the resident dwelling to which the visitor wants to visit.

Also, the four dedicated buttons 111 and name plates 122 provided on the calling unit 121 of the collective foyer device 10A are configured so that some of the dedicated buttons 111 and name plates 122 can be invisibly concealed in correspondence to the number of dwellings. For this reason, for example, it is possible to appropriately use the general-purpose collective foyer device 10A of which each calling unit 121 is provided in advance with the four dedicated buttons 111, for a dwelling building of which the number of dwellings is different, in conformity to the number of the respective dwellings, and to easily perform the calling setting of the dwelling parent devices 30 by using the general-purpose collective foyer device.

Also, the setting data of the calling tables stored in the collective foyer device 10 and the building control unit 40 can be changed by the external device 80 connected to the collective foyer device 10 and the building control unit 40. For this reason, for example, the construction operator or manager of the intercom system 1 can easily associate the dwelling parent device 30 and the dedicated button 111 each other. Also, since it is possible to beforehand set the data of the calling table 140 with the external device 80 and to transmit the set calling table 140 to the collective foyer device 10 and the building control unit 40, the operating time is shortened.

Also, in the calling table 140, the plurality of dwelling parent devices ID can be assigned to one location number. Therefore, even when there is the plurality of dwelling parent devices 30 in the dwelling, it is possible to call each dwelling parent device 30 in the dwelling of the calling destination.

In the meantime, the present invention is not limited to the illustrative embodiment, and can be appropriately modified and improved. In addition, the materials, shapes, dimensions, numerical values, forms, number, arrangement places and the like of the respective constitutional elements of the illustrative embodiment are arbitrary and are not particularly limited inasmuch as the present invention can be implemented.

The subject application is based on Japanese Patent Application No. 2016-063067 filed on Mar. 28, 2016, the contents of which are incorporated herein by reference.

The invention claimed is:

1. An intercom system comprising:
a dwelling parent device installed in each dwelling;
a collective foyer device configured to communicate with the dwelling parent device, and
a control device configured to control the collective foyer device,
wherein the collective foyer device comprises:
a plurality of dwelling information display units on each of which dwelling information for specifying a dwelling parent device of a resident is displayed for calling the resident, and
a plurality of dedicated input receiving units correlated with the dwelling information display units and capable of receiving an operation for calling the dwelling parent device corresponding to the dwelling information displayed on each dwelling information,
wherein the collective foyer device or the control device comprises a management table in which location numbers for specifying locations of the plurality of dedicated input receiving units in a predetermined region of the collective foyer device are assigned,
wherein respective dwelling information is assigned to the location numbers of the dedicated input receiving units and is externally visible on the collective foyer device, and is stored on the management table, and dwelling information that is not externally visible on the collective foyer device is not stored on the management table.

2. The intercom system according to claim 1, wherein a setting of the management table can be changed by an external device that is communicatively connected to the collective foyer device or the control device.

3. The intercom system according to claim 1, wherein the management table is configured so that a plurality of dwelling parent devices ID is assigned to each of the location numbers.

4. The intercom system according to claim 1, wherein the collective foyer device has a predetermined number of the plurality of dwelling information display units, and
wherein some dwelling information display units of the plurality of dwelling information display units are invisibly concealed, in correspondence to the number of the dwellings.

5. A method for establishing an intercommunication system having a dwelling parent device installed in each dwelling, a collective foyer device configured to communicate with the dwelling parent device, and a control device configured to control the collective foyer device, the method comprising:
displaying information, specifying a dwelling parent device of a resident for calling the resident, on each of a plurality of dwelling information display units;
receiving an operation for calling the dwelling parent device corresponding to the dwelling information displayed on each dwelling information, the operation being received through a plurality of dedicated input receiving units correlated with the dwelling information display units;
assigning location numbers for specifying locations of the plurality of dedicated input receiving units in a predetermined region of the collective foyer device in a management table located in the collective foyer device or the control device;
assigning respective dwelling information to the location numbers of the dedicated input receiving units externally visible on the collective foyer device, storing the respective dwelling information on the management table, and not storing dwelling information that is not externally visible on the collective foyer device on the management table.

6. The method for establishing an intercommunication system according to claim 5, wherein a setting of the management table can be changed by an external device that is communicatively connected to the collective foyer device or the control device.

7. The method for establishing an intercommunication system according to claim 5, wherein the management table is configured so that a plurality of dwelling parent devices ID is assigned to each of the location numbers.

8. The method for establishing an intercommunication system according to claim 5, wherein the collective foyer device has a predetermined number of the plurality of dwelling information display units, and
   wherein some dwelling information display units of the plurality of dwelling information display units are invisibly concealed, in correspondence to the number of the dwellings.

* * * * *